US009610749B2

(12) United States Patent
Ore-Yang

(10) Patent No.: US 9,610,749 B2
(45) Date of Patent: Apr. 4, 2017

(54) METHOD FOR MANUFACTURING PROTECTOR FOR PORTABLE ELECTRONIC DEVICE

(71) Applicant: ACROX TECHNOLOGIES CO., LTD, Taipei (TW)

(72) Inventor: Steve Ore-Yang, Taipei (TW)

(73) Assignee: ACROX TECHNOLOGIES CO. LTD., Taipei (TW)

( * ) Notice: Subject to any disclaimer, the term of this patent is extended or adjusted under 35 U.S.C. 154(b) by 567 days.

(21) Appl. No.: 14/155,466

(22) Filed: Jan. 15, 2014

(65) Prior Publication Data

US 2014/0128234 A1 May 8, 2014

Related U.S. Application Data

(62) Division of application No. 13/431,389, filed on Mar. 27, 2012, now Pat. No. 8,746,447.

(51) Int. Cl.
*B31B 1/00* (2006.01)
*B31B 1/64* (2006.01)
*A45C 11/00* (2006.01)

(52) U.S. Cl.
CPC ............... *B31B 1/64* (2013.01); *A45C 11/00* (2013.01); *A45C 2011/002* (2013.01)

(58) Field of Classification Search
CPC .............. B31B 1/00; B31B 1/64; A45C 11/00
See application file for complete search history.

(56) References Cited

U.S. PATENT DOCUMENTS 4,784,906 A 11/1988 Akao
4,872,538 A 10/1989 Fournier
5,129,519 A 7/1992 David et al.
5,607,054 A 3/1997 Hollingsworth
5,848,509 A * 12/1998 Knapp ..................... B32B 5/26
428/36.1

(Continued)

FOREIGN PATENT DOCUMENTS

TW M417585 12/2011
WO 97/08401 3/1997

OTHER PUBLICATIONS

Search Report for Corresponding Taiwanese Application No. 1001 46935, Jan. 27, 2014.

*Primary Examiner* — Michael N Orlando
*Assistant Examiner* — Matthew Hoover
(74) *Attorney, Agent, or Firm* — Gottlieb, Rackman & Reisman, P.C.

(57) ABSTRACT

A method for manufacturing a protector for a portable electronic device includes following steps. A substrate having a first surface, a second surface and an edge is provided. A first sheet having a first sheet surface and an edge portion is provided, wherein the first sheet surface includes a first hot-melt adhesive. The first surface of the substrate is caused to contact the first sheet surface, wherein the edge portion protrudes the edge. The edge portion is folded along the edge to enable the first hot-melt adhesive to contact the second surface of the substrate. A second sheet having a second sheet surface including a second hot-melt adhesive is provided. The second surface of the substrate and the edge portion is caused to contact the second sheet surface. A thermocompression bonding is performed to bond the first sheet, the second sheet and the substrate together.

12 Claims, 6 Drawing Sheets

(56) References Cited

U.S. PATENT DOCUMENTS

| | | |
|---|---|---|
| 6,079,528 A | 6/2000 | Moor |
| 7,106,202 B2 | 9/2006 | Dickinson |
| 7,252,868 B2 * | 8/2007 | Suda .................. B32B 5/24 |
| | | 156/247 |
| 7,549,535 B2 | 6/2009 | Pelo |
| 2003/0052035 A1 | 3/2003 | Dickinson |
| 2010/0089779 A1 | 4/2010 | Bowers |
| 2011/0204112 A1 | 8/2011 | Crandall et al. |
| 2011/0272305 A1 | 11/2011 | Lee |
| 2011/0290687 A1 | 12/2011 | Han |
| 2012/0043247 A1 | 2/2012 | Weffstrup |

* cited by examiner

METHOD FOR MANUFACTURING PROTECTOR FOR PORTABLE ELECTRONIC DEVICE

CROSS-REFERENCES TO RELATED APPLICATIONS

This application is a division of U.S. patent application Ser. No. 13/431,389, filed Mar. 27, 2012, the disclosures of which are incorporated herein in their entirety by reference.

FIELD OF THE INVENTION

The present invention relates to a protector, and more particularly to a protector for a portable electronic device.

BACKGROUND OF THE INVENTION

Recently, portable electronic devices, e.g. cellphones, e-books or tablet PCs, have been very popular. Since such electronic devices are portable, it is necessary to properly wrap the portable electronic device for protection. Please refer to FIG. 1, which shows a conventional protector 1. The protector 1 is divided into a left portion and a right portion by a bending portion 13. A portable electronic device 2 is placed in the right portion of the protector 1. The surface of the portable electronic device 2 is mostly occupied by a screen 20. Since the screen 20 is transparent and easily broken, worn and soiled, it needs the protector 1 for protection. The left portion of the protector 1 can cover the screen 20 for protection. With the bending portion 13, the protector 1 can be opened and closed like a book, and kept as a unit. In order to prevent the portable electronic device 2 from damage due to inward bending of the protector 1 by an external force, two substrates 10 (represented by the dotted lines in FIG. 1) are disposed inside the protector 1. Usually, the substrates 10 are made of a hard material. One substrate 10 is disposed in the left portion of the protector 1 and the other is disposed in the right portion. In order to lighten the protector 1 and save space, the bending portion 13 is usually made of a fabric 11 rather than a chain. The size of the fabric 11 is sufficient to cover two parallel substrates 10. Besides, each of the substrates 10 is sandwiched between two parts of fabric 11. One part of fabric 11 is disposed in the front and the other part is disposed in the rear. A specific width is reserved at a substantially central position of the fabric 11 so that the left side of the fabric 11 can directly contact the right side of the fabric 11. Hence, since the fabric 11 is suitable for repeated bending, the bending portion 13 is formed at the substantially central position of the fabric 11 naturally.

In order to fix the substrate 10 between the front part of the fabric 11 and the rear part of the fabric 11, the portion of the front part of the fabric 11 extending out of the substrate 10 is directly bonded to the rear part of the fabric 11 extending out of the substrate 10, usually in the way of ultrasonic welding. Therefore, a closed portion 12 is formed along the rim of the protector 1.

Please refer to FIG. 2, which is a cross-sectional view of FIG. 1 along the A-A line. As shown in FIG. 2, the substrate 10 has a first surface 101 and a second surface 102. A first sheet 111 is disposed on the first surface 101, and a second sheet 112 is disposed on the second surface 102. That is, when the first sheet 111 is the above-mentioned front part of the fabric 11, the second sheet 112 is the above-mentioned rear part of the fabric 11; when the first sheet 111 is the above-mentioned rear part of the fabric 11, the second sheet 112 is the above-mentioned front part of the fabric 11. The first sheet 111 is boned to the second sheet 112 along the rim of the substrate 10 to form the closed portion 12. It is similar to the structure of the skin of a steamed dumpling. Hence, since there is no substrate 10 in the closed portion 12, i.e. the closed portion 12 is made of fabric only, the first sheet 111 and the second sheet 112 are usually made of fabric with a harder texture. Moreover, since the closed portion 12 is usually formed in the way of ultrasonic welding, it has a higher material density and tenacity. However, after long-term use, the closed portion 12 will be wrinkled, bended or even split due to extrusion and collision. That is, the first sheet 111 will be separated from the second sheet 112. Besides, users are easily to be slashed due to the thin and sharp structure of the closed portion 12.

In order to overcome the drawbacks in the prior art, a protector for a portable electronic device and a method for manufacturing the same are provided. The particular design in the present invention not only solves the problems described above, but also is easy to be implemented. Thus, the present invention has the utility for the industry.

SUMMARY OF THE INVENTION

The object of the present invention is to enhance the structural strength of the protector for the portable electronic device, thereby enhancing the durability thereof. Additionally, the present invention can enhance the aesthetic feeling of the protector so that the user can use a durable and beautiful protector. By using the way of sheet folding, the first sheet is folded along the edge of the substrate, disposed on the second surface of the substrate, and sandwiched between the second sheet and the substrate, and a thermo-compression bonding is performed to bond the first sheet, the second sheet and the substrate together. In this way, there will be no closed portion. This makes the structure of the protector more rigid, the volume thereof smaller, and the appearance thereof simpler. Besides, since there is no closed portion, the wrinkling and bending issues after long-term use will not occur, and the user will not be slashed.

In accordance with an aspect of the present invention, a protector for a portable electronic device is provided. The protector includes a substrate having a first surface, a second surface and an edge; a first sheet disposed on the first surface and having an edge portion; and a second sheet disposed on the second surface, wherein the edge portion of the first sheet is folded along the edge of the substrate, disposed on the second surface, and disposed between the second sheet and the substrate.

In accordance with another aspect of the present invention, a method for manufacturing a protector for a portable electronic device is provided. The method includes steps of providing a substrate having a first surface, a second surface and an edge; providing a first sheet having a first sheet surface and an edge portion, wherein the first sheet surface of the first sheet includes a first hot-melt adhesive; causing the first surface of the substrate to contact the first sheet surface of the first sheet, wherein the edge portion of the first sheet protrudes the edge of the substrate; folding the edge portion of the first sheet along the edge of the substrate to enable the first sheet surface of the first sheet to contact the second surface of the substrate; providing a second sheet having a second sheet surface including a second hot-melt adhesive; causing the second surface of the substrate and the edge portion of the first sheet to contact the second sheet surface of the second sheet; and performing a thermocompression bonding to bond the first sheet, the second sheet and the substrate together.

In accordance with a further aspect of the present invention, a method for manufacturing a protector for a portable electronic device is provided. The method includes steps of providing a substrate having a first surface, a second surface and an edge; providing a first sheet having a first sheet surface and an edge portion, wherein the first sheet surface of the first sheet includes a first hot-melt adhesive; causing the first surface of the substrate to contact the first sheet surface of the first sheet, wherein the edge portion of the first sheet protrudes the edge of the substrate; performing a first thermocompression bonding to bond the substrate and the first sheet; folding the edge portion of the first sheet along the edge of the substrate to enable the first sheet surface of the first sheet to contact the second surface of the substrate; performing a second thermocompression bonding to bond the edge portion of the first sheet onto the second surface of the substrate; providing a second sheet having a second sheet surface including a second hot-melt adhesive; and performing a third thermocompression bonding to bond the substrate, the edge portion of the first sheet and the second sheet.

In accordance with further another aspect of the present invention, a method for manufacturing a protector for a portable electronic device is provided. The method includes steps of providing a substrate having a first surface, a second surface and an edge; providing a first sheet having a first surface and an edge portion, wherein the first surface of the first sheet includes a first hot-melt adhesive; contacting the first surface of the substrate with the first surface of the first sheet, wherein the edge portion of the first sheet protrudes the edge of the substrate; folding the edge portion of the first sheet along the edge of the substrate to enable the first surface of the first sheet to contact the second surface of the substrate; performing a first thermocompression bonding to bond the substrate and the first sheet, and a second thermocompression bonding to bond the edge portion of the first sheet onto the second surface of the substrate simultaneously; providing a second sheet having a second surface including a second hot-melt adhesive; causing the second surface of the second sheet to contact the second surface of the substrate and the edge portion of the first sheet; and performing a second thermocompression bonding to bond the substrate, the edge portion of the first sheet and the second sheet.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
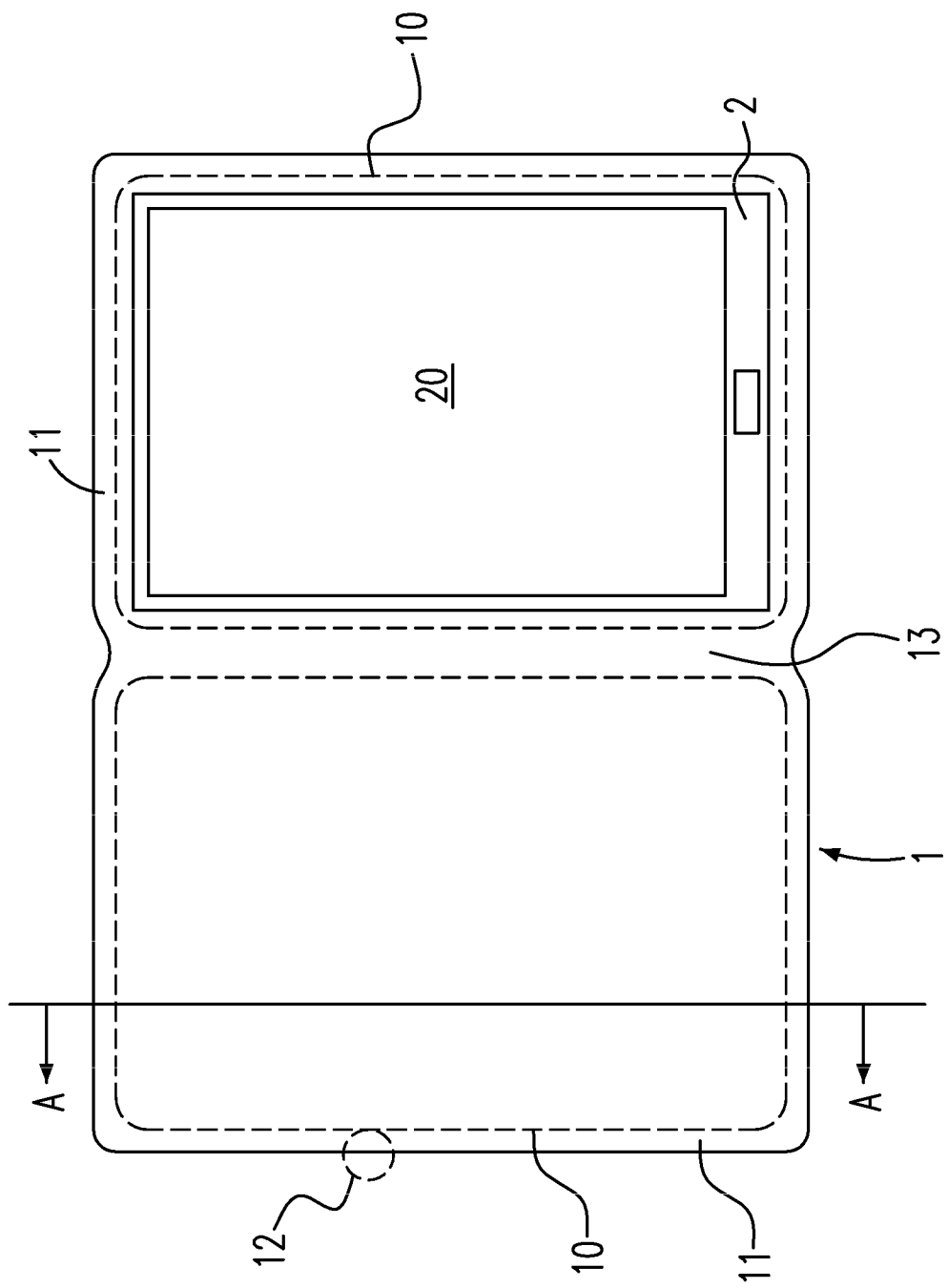
FIG. 1 shows a conventional protector.
Figure 2:
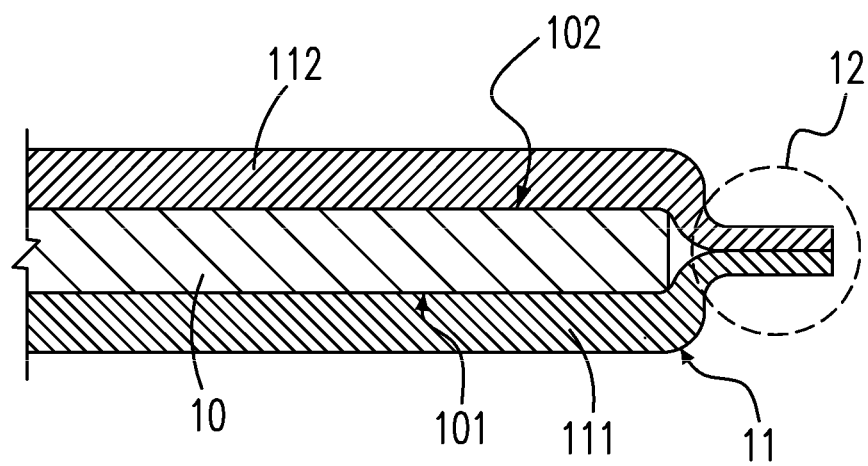
FIG. 2 is a cross-sectional view of FIG. 1 along an A-A line.
Figure 3:
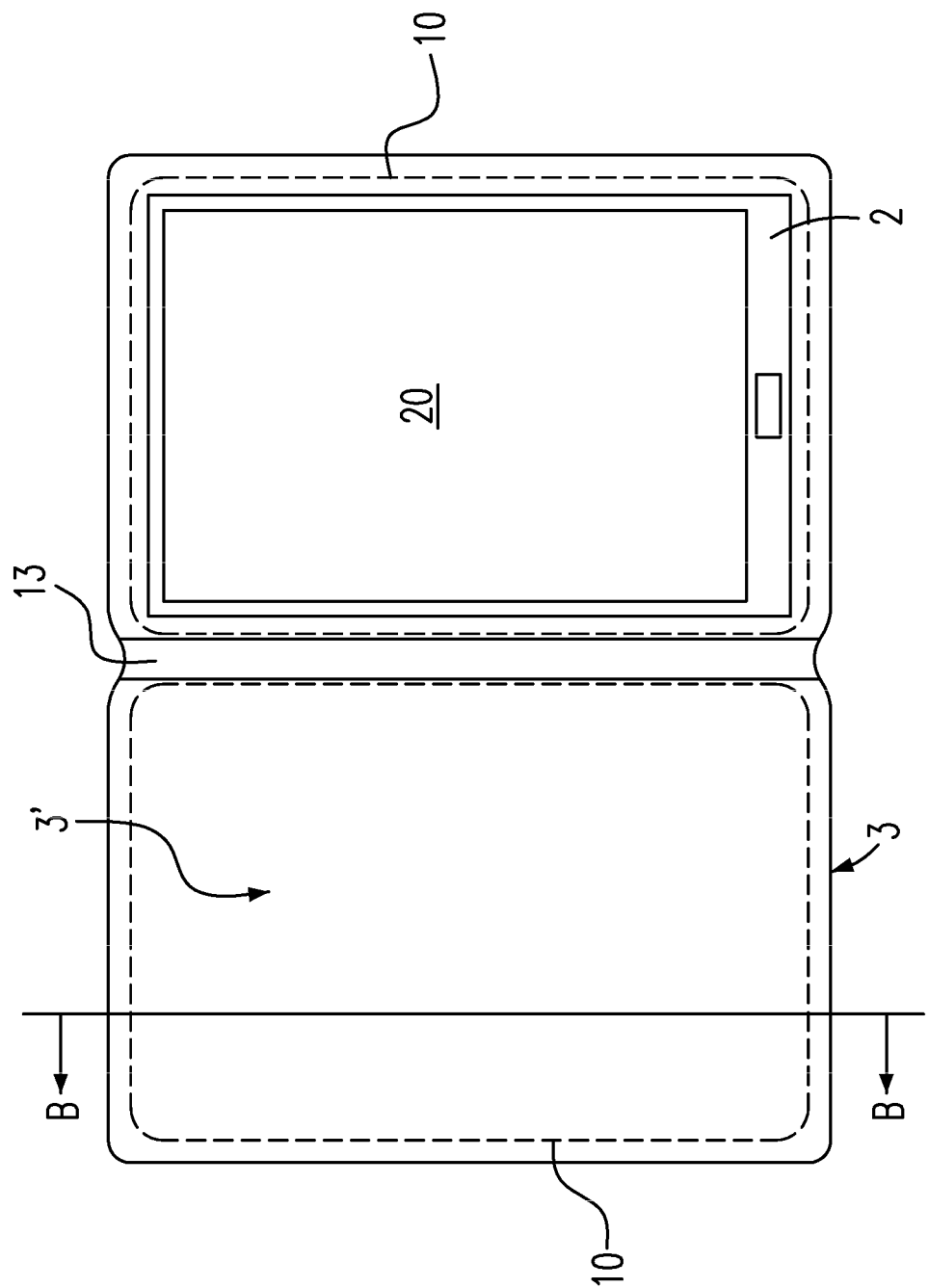
FIG. 3 shows a protector according to the present invention.
Figure 4:
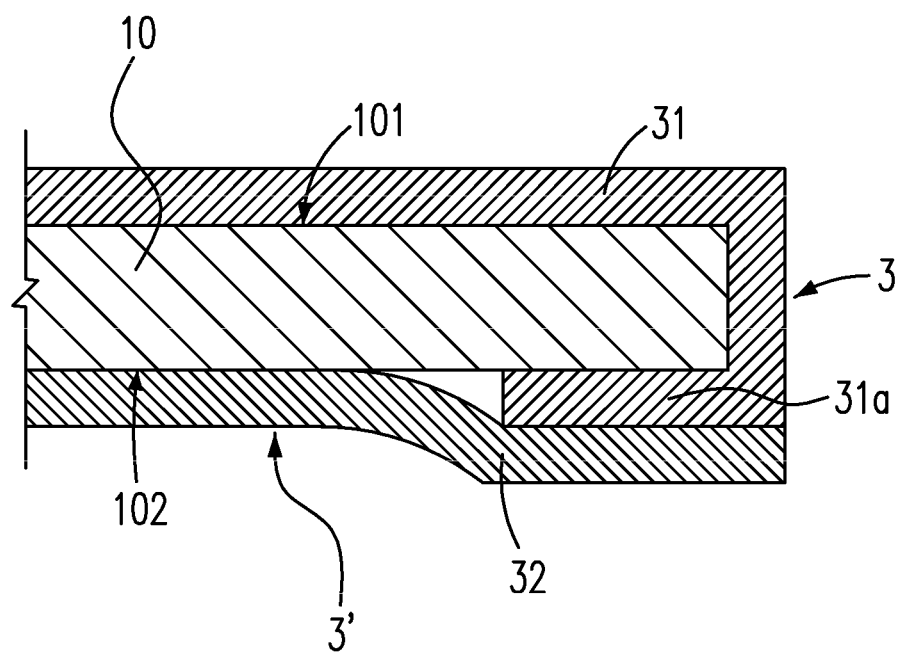
FIG. 4 is a cross-sectional view of FIG. 3 along a B-B line.

Please refer to FIGS. 3 and 4. FIG. 3 shows a protector 3 according to the present invention, and FIG. 4 is a cross-sectional view of FIG. 3 along the B-B line. The protector 3 is divided into a left portion and a right portion by a bending portion 13. A portable electronic device 2 is placed in the right portion of the protector 3. The surface of the portable electronic device 2 is mostly occupied by a screen 20. Since the screen 20 is transparent and easily broken, worn and soiled, it needs the protector 3 for protection. The left portion of the protector 3 can cover the screen 20 for protection. With the bending portion 13, the protector 3 can be opened and closed like a book, and kept as a unit. In order to prevent the portable electronic device 2 from damage due to inward bending of the protector 3 by an external force, two substrates 10 are disposed inside the protector 3. Since the protector 3 of FIG. 3 does not have the closed portion 12 used in the prior art (please refer to FIG. 2), the boundary of the substrate 10 is aligned with that of the protector 3. Usually, the substrates 10 are made of a hard material. One substrate 10 is disposed in the left portion of the protector 3 and the other is disposed in the right portion. In order to lighten the protector 3 and save space, the bending portion 13 is usually made of a fabric 3' rather than a chain. The size of the fabric 3' is sufficient to cover two parallel substrates 10. Besides, each of the substrates 10 is sandwiched between two parts of the fabric 3'. One part of the fabric 3' is disposed in the front and the other is disposed in the rear. A specific width is reserved at a substantially central position of the fabric 3' so that the left side of the fabric 3' can directly contact the right side of the fabric 3'. Hence, since the fabric 3' is suitable for repeated bending, the bending portion 13 is formed at the substantially central position of the fabric 3' naturally.

The substrate 10 has a first surface 101 and a second surface 102. A first fabric 31 is disposed on the first surface 101, and a second fabric 32 is disposed on the second surface 102. The first fabric 31 has an edge portion 31a, which is folded along the edge of the substrate 10, disposed on the second surface 102, and sandwiched between the second fabric 32 and the substrate 10. That is, the second fabric 32 is bonded to the second surface 102 of the substrate 10 and the edge portion 31a. Usually, the first fabric 31 and the second fabric 32 are permanently bonded to the substrate 10 by thermocompression bonding. Therefore, a hot-melt adhesive layer is formed on the surface of the first fabric 31 for being bonded to the substrate 10, or the above-mentioned surface of the first fabric 31 includes the hot-melt adhesive. A hot-melt adhesive layer is formed on the surface of the second fabric 32 for being bonded to the substrate 10 and the edge portion 31a, or the above-mentioned surface of the second fabric 32 includes the hot-melt adhesive. When performing the bonding process, the respective positions of the first fabric 31, the edge portion 31a, the second fabric 32 and the substrate 10 can be first ascertained, and then a single thermocompression bonding is performed to permanently bond them together. Alternatively, a first thermocompression bonding is performed to bond the first fabric 31 and the first surface 101 of the substrate 10 first, then a second thermocompression bonding is performed to bond the edge portion 31a and the second surface 102 of the substrate 10, and finally a third thermocompression bonding is performed to bond the second fabric 32, the second surface 102 of the substrate 10 and the edge portion 31a. Alternatively, the first surface 101 can contact the first fabric 31 first, then the edge portion 31a is folded to contact the second surface 102, and then a first thermocompression bonding is performed to bond the first fabric 31 and the first surface 101, and the second surface 102 and the edge portion 31a simultaneously. Finally a second thermocompression bonding is performed for the second fabric 32, the second surface 102 and the edge portion 31a to permanently bond them together. In FIG. 4, the respective thicknesses of the first fabric 31 and the second fabric 32 are only for convenient identification. Practically, the respective thicknesses of the first fabric 31 and the second fabric 32 are smaller than that of the substrate 10 by a certain proportion.

Figure 5A:
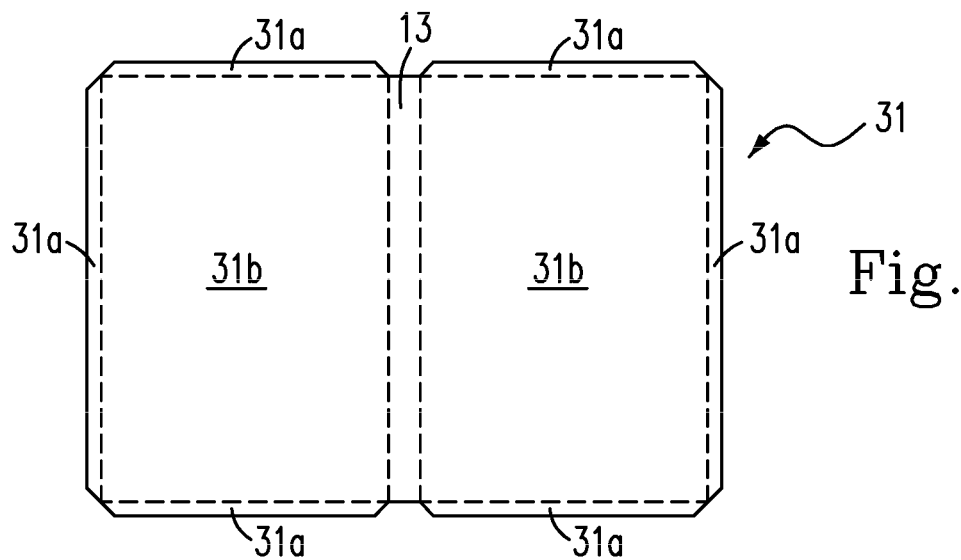
FIGS. 5a-5c show a method for manufacturing a protector according to a first embodiment of the present invention.
Figure 5B:
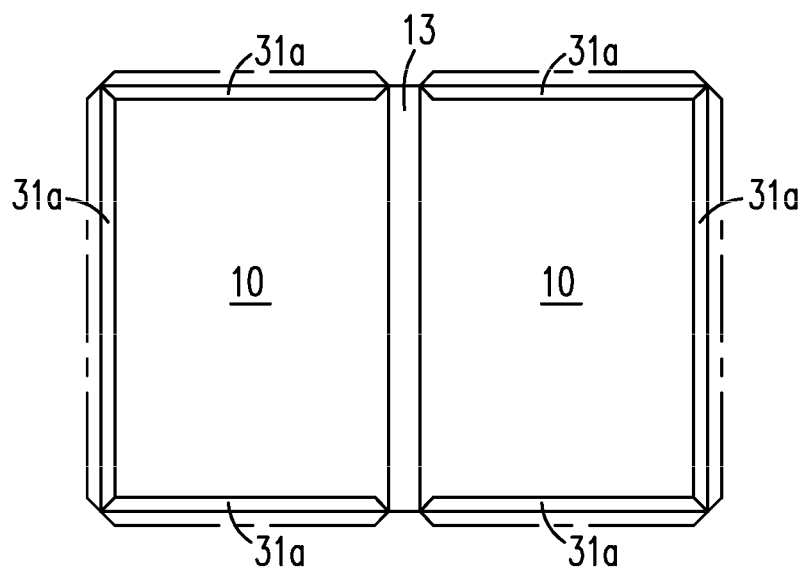
Figure 5C:
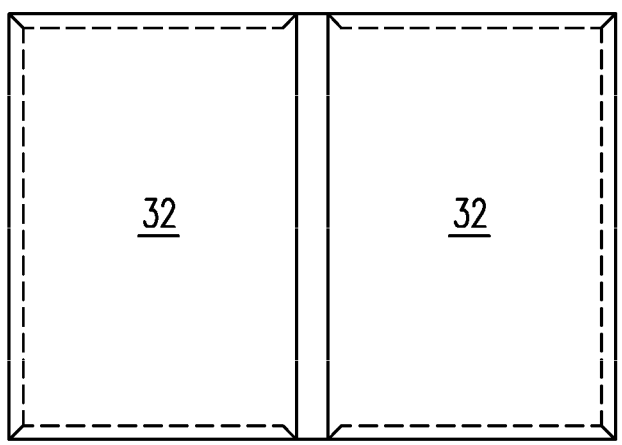

Please refer to FIGS. 5a-5c, which show a method for manufacturing a protector according to a first embodiment of the present invention. As shown in FIG. 5a, the first fabric 31 is unfolded. A number of edge portions 31a are formed along the edge of the first fabric 31. The bending portion 13 is formed at the center. The first fabric 31 includes two substrate bonding portions 31b respectively at the left and at the right, i.e. the two portions formed by the dotted lines. As shown in FIG. 5b, when two substrates 10 are disposed on the two substrate bonding portions 31b, the edge portions 31a are folded along the edges of the two substrates 10 to contact the two substrates 10. As shown in FIG. 5c, the second fabric 32 is disposed on the two substrates 10 and the edge portions 31a. Usually, the second fabric 32 is a slice of fabric extending from the left edge of the protector 3 to the right. Certainly, the second fabric 32 also can include two or more than two slices of fabrics according to actual needs.

Figure 6A:
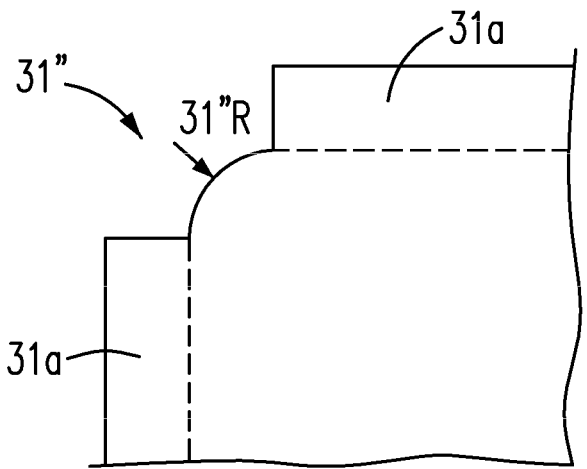
FIGS. 6a-6c show a method for manufacturing a protector according to a second embodiment of the present invention.
Figure 6B:
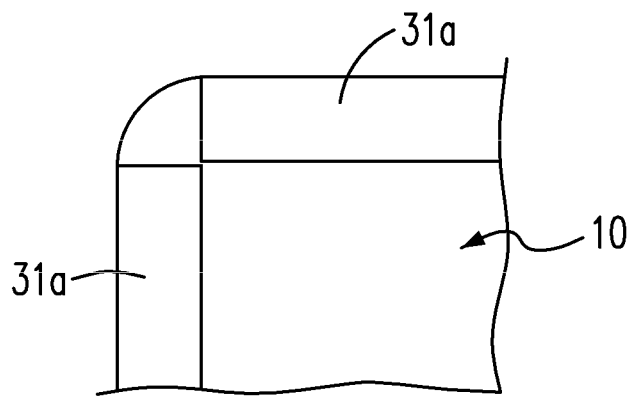
Figure 6C:
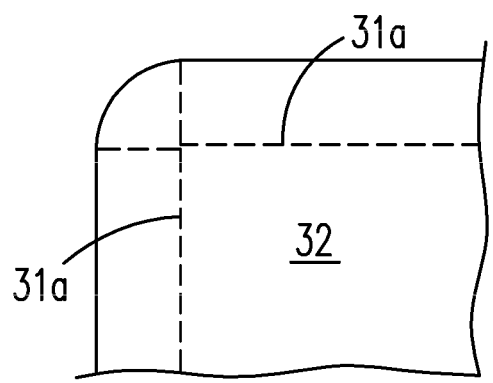

Please refer to FIGS. 6a-6c, which show a method for manufacturing a protector according to a second embodiment of the present invention. In comparison, the elements mentioned for FIGS. 6a-6c are approximately the same as those of FIGS. 5a-5c, except that the first round-angle fabric 31" of FIGS. 6a-6c has round corners 31"R. As shown in FIG. 6a, the edge portions 31a are only formed in the straight sections away from the round corners 31"R, without being connected to the curve sections of the round corners 31"R. In this way, when the two substrates 10 are disposed on the two substrate bonding portions 31b and the edges portions 31a are folded to contact the second surface 102 of the substrate 10 (please refer to FIG. 4), the undesirable wrinkling will not occur due to the design of the round corners 31"R. As shown in FIG. 6b, it is clear that the edge portions 31a can contact the substrate 10 evenly. Certainly, the substrate 10 also has round corners corresponding to the round corners 31"R of the first round-angle fabric 31". As shown in FIG. 6c, the second fabric 32 is disposed on the substrate 10 and the edge portions 31a (the dotted lines).

In conclusion, the present invention discards the closed portion in the prior art, whose shape is like a steamed dumpling. Since the closed portion forms a structure that protrudes the substrate and constitutes the edge of the conventional protector, it is easy to be bended and deformed due to collision. Besides, the closed portion also increases the size of the protector. Hence, in the present invention, the front fabric or the rear fabric of the protector is designed to have edge portions. The edge portions are folded from one surface of the substrate to the other surface along the substrate edge, and the folded edge portions and the substrate are covered with the other fabric. In this way, the closed portion is no longer necessary. Accordingly, when the edge of the protector of the present invention is extruded and collided by an external force, the external force is directly borne by the substrate so that the edge of the protector of the present invention will not be bended, wrinkled or split like the closed portion in the prior art. Moreover, since the protector of the present invention does not have the closed portion, the size of the protector is smaller. Besides, after long-term use, the edge of the protector will not be wrinkled since the protector does not have the closed portion so that the aesthetic feeling of the protector is enhanced. Furthermore, the present invention uses the technology of thermocompression bonding to enhance the life of the protector, i.e. enhancing the durability of the protector. The minimum temperature for the thermocompression bonding of the present invention is 100° C., and the maximum temperature is 190° C. That is, the temperature range for the thermocompression bonding of the present invention is from 100° C. to 190° C. Accordingly, the present invention greatly contributes to the protector for the portable electronic device, e.g. the cellphone or the tablet PC, and the method for manufacturing the same.

EMBODIMENTS

1. A protector for a portable electronic device, comprising: a substrate having a first surface, a second surface and an edge; a first sheet disposed on the first surface and having an edge portion; and a second sheet disposed on the second surface, wherein the edge portion of the first sheet is folded along the edge of the substrate, disposed on the second surface, and sandwiched between the second sheet and the substrate.

2. The protector of Embodiment 1, wherein the substrate has a material including one selected from a group consisting of a plastics, a fiber, a rubber and a metal.

3. The protector of any one of Embodiments 1-2, wherein the first sheet has a material being a fabric.

4. The protector of any one of Embodiments 1-3, wherein the second sheet has a material being a fabric.

5. The protector of any one of Embodiments 1-4, wherein the first sheet has a surface facing the first surface of the substrate and including a hot-melt adhesive.

6. The protector of any one of Embodiments 1-5, wherein the second sheet has a surface facing the second surface of the substrate and including a hot-melt adhesive.

7. A method for manufacturing a protector for a portable electronic device, comprising steps of: providing a substrate having a first surface, a second surface and an edge; providing a first sheet having a first sheet surface and an edge portion, wherein the first sheet surface of the first sheet includes a first hot-melt adhesive; causing the first surface of the substrate to contact the first sheet surface of the first sheet, wherein the edge portion of the first sheet protrudes the edge of the substrate; folding the edge portion of the first sheet along the edge of the substrate to enable the first hot-melt adhesive of the first sheet surface to contact the second surface of the substrate; providing a second sheet having a second sheet surface including a second hot-melt adhesive; causing the second surface of the substrate and the edge portion of the first sheet to contact the second sheet surface of the second sheet; and performing a thermocompression bonding to bond the first sheet, the second sheet and the substrate together.

8. The method of Embodiment 7, wherein the step of folding includes a sub-step of causing the edge portion of the first sheet to tightly contact the edge of the substrate.

9. The method of any one of Embodiments 7-8, wherein the edge portion of the second sheet is aligned with the edge of the substrate.

10. The method of any one of Embodiments 7-9, wherein the thermocompression bonding is performed at a temperature of 100° C. to 190° C.

11. A method for manufacturing a protector for a portable electronic device, comprising steps of: providing a substrate having a first surface, a second surface and an edge; providing a first sheet having a first sheet surface and an edge portion, wherein the first sheet surface of the first sheet includes a first hot-melt adhesive; causing the first surface of the substrate to contact the first sheet surface of the first sheet, wherein the edge portion of the first sheet protrudes the edge of the substrate; performing a first thermocompression bonding to bond the substrate and the first sheet; folding the edge portion of the first sheet along the edge of the substrate to enable the first sheet surface of the first sheet to contact the second surface of the substrate; performing a second thermocompression bonding to bond the edge portion of the first sheet onto the second surface of the substrate; providing a second sheet having a second sheet surface including a second hot-melt adhesive; and performing a third thermocompression bonding to bond the substrate, the edge portion of the first sheet and the second sheet.

12. The method of Embodiment 11, wherein the step of folding includes a sub-step of causing the edge portion of the first sheet to tightly contact the edge of the substrate.

13. The method of any one of Embodiments 11-12, wherein the edge portion of the second sheet is aligned with the edge of the substrate.

14. The method of any one of Embodiments 11-13, wherein each of the first thermocompression bonding, the second thermocompression bonding and the third thermocompression bonding is performed at a temperature of 100° C. to 190° C.

15. A method for manufacturing a protector for a portable electronic device, comprising steps of: providing a substrate having a first surface, a second surface and an edge; providing a first sheet having a first surface and an edge portion, wherein the first surface of the first sheet includes a first hot-melt adhesive; causing the first surface of the substrate to contact the first surface of the first sheet, wherein the edge portion of the first sheet protrudes the edge of the substrate; folding the edge portion of the first sheet along the edge of the substrate to enable the first surface of the first sheet to contact the second surface of the substrate; performing a first thermocompression bonding to bond the substrate and the first sheet, and the edge portion of the first sheet onto the second surface of the substrate; providing a second sheet having a second surface including a second hot-melt adhesive; causing the second surface of the second sheet to contact the second surface of the substrate and the edge portion of the first sheet; and performing a second thermocompression bonding to bond the substrate, the edge portion of the first sheet and the second sheet.

16. The method of Embodiment 15, wherein the step of folding includes a sub-step of causing the edge portion of the first sheet to tightly contact the edge of the substrate.

17. The method of any one of Embodiments 15-16, wherein the edge portion of the second sheet is aligned with the edge of the substrate.

18. The method of any one of Embodiments 15-17, wherein each of the first thermocompression bonding and the second thermocompression bonding is performed at a temperature of 100° C. to 190° C.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for manufacturing a protector for a portable electronic device, comprising steps of:
   providing a first substrate having a first surface, a second surface opposite to the first surface and a first edge;
   providing a second substrate having a third surface, a fourth surface opposite to the third surface and a second edge;
   providing a first sheet having a first sheet surface, a first central portion, a first edge portion relative to the first central portion and a second edge portion opposite to the first edge portion, wherein the first sheet surface of the first sheet includes a first hot-melt adhesive;
   causing the first surface of the first substrate to contact the first sheet surface of the first sheet, wherein the first edge portion of the first sheet protrudes over the first edge of the first substrate;
   causing the third surface of the second substrate to contact the first sheet surface of the first sheet, wherein the second edge portion of the first sheet protrudes over the second edge of the second substrate;
   folding the first edge portion of the first sheet along the first edge of the first substrate to enable the first hot-melt adhesive of the first sheet surface to contact the second surface of the first substrate;
   folding the second edge portion of the first sheet along the second edge of the second substrate to enable the first hot-melt adhesive of the first sheet surface to contact the fourth surface of the second substrate
   providing a second sheet having a second central portion, and a second sheet surface including a second hot-melt adhesive,
   causing the second surface of the first substrate and the first edge portion of the first sheet to contact the second sheet surface of the second sheet;
   causing the fourth surface of the second substrate and the second edge portion of the first sheet to contact the second sheet surface of the second sheet; and
   performing a thermocompression bonding to bond the first sheet, the second sheet and the substrate together, wherein the first central portion and the second central portion form a bending portion of the protector through the thermocompression bonding.

2. The method according to claim 1, wherein the step of folding the first edge portion includes a sub-step of causing the first edge portion of the first sheet to tightly contact the first edge of the first substrate.

3. The method according to claim 1, wherein the second sheet further has a third edge portion being is aligned with the first edge of the first substrate.

4. The method according to claim 1, wherein the thermocompression bonding is performed at a temperature of 1000° C. to 190° C.

5. A method for manufacturing a protector for a portable electronic device, comprising steps of:

providing a first substrate having a first surface, a second surface opposite to the first surface and a first edge;

providing a second substrate having a third surface, a fourth surface opposite to the third surface and a second edge;

providing a first sheet having a first sheet surface, a first central portion, a first edge portion relative to the first central portion and a second edge portion opposite to the first edge portion, wherein the first sheet surface of the first sheet includes a first hot-melt adhesive;

causing the first surface of the first substrate to contact the first sheet surface of the first sheet, wherein the first edge portion of the first sheet protrudes over the first edge of the first substrate;

causing the third surface of the second substrate to contact the first sheet surface of the first sheet, wherein the second edge portion of the first sheet protrudes over the second edge of the second substrate;

performing a first thermocompression bonding to bond the first substrate, the second substrate and the first sheet;

folding the first edge portion of the first sheet along the first edge of the first substrate to enable the first sheet surface of the first sheet to contact the second surface of the first substrate;

folding the second edge portion of the first sheet along the second edge of the second substrate to enable the first sheet surface of the first sheet to contact the fourth surface of the second substrate;

performing a second thermocompression bonding to bond the first edge portion of the first sheet onto the second surface of the first substrate and bond the second edge portion of the first sheet onto the fourth surface of the second substrate;

providing a second sheet having a second central portion, and a second sheet surface including a second hot-melt adhesive; and performing a third thermocompression bonding to bond the first substrate and the second substrate, the first edge portion and the second edge portion of the first sheet and the second sheet, wherein the first central portion and the second central portion form a bending portion of the protector through the third thermocompression bonding.

6. The method according to claim 5, wherein the step of folding the first edge portion includes a sub-step of causing the first edge portion of the first sheet to tightly contact the first edge of the first substrate.

7. The method according to claim 5, wherein the second sheet further has a third edge portion that is aligned with the first edge of the first substrate.

8. The method according to claim 5, wherein each of the first thermocompression bonding, the second thermocompression bonding and the third thermocompression bonding is performed at a temperature of 100° C. to 190° C.

9. A method for manufacturing a protector for a portable electronic device, comprising steps of:

providing a first substrate having a first surface, a second surface opposite to the first surface and a first edge;

providing a second substrate having a third surface, a fourth surface opposite to the third surface and a second edge;

providing a first sheet having a first sheet surface, a first central portion, a first edge portion relative to the first central portion and a second edge portion opposite to the first edge portion, wherein the first sheet surface of the first sheet includes a first hot-melt adhesive;

causing the first surface of the first substrate to contact the first sheet surface of the first sheet, wherein the first edge portion of the first sheet protrudes over the first edge of the first substrate;

folding the first edge portion of the first sheet along the first edge of the first substrate to enable the first sheet surface of the first sheet to contact the second surface of the first substrate;

folding the second edge portion of the first sheet along the second edge of the second substrate to enable the first sheet surface of the first sheet to contact the fourth surface of the second substrate;

performing a first thermocompression bonding to bond the first substrate and the second substrate and the first sheet, the first edge portion of the first sheet onto the second surface of the first substrate, and the second edge portion of the first sheet onto the fourth surface of the second substrate;

providing a second sheet having a second central portion, and a second sheet surface including a second hot-melt adhesive;

causing the second sheet surface of the second sheet to contact the second surface of the first substrate, the fourth surface of the second substrate and the first edge portion and the second edge portion of the first sheet; and performing a second thermocompression bonding to bond the first substrate and the second substrate, the first edge portion and the second edge portion of the first sheet and the second sheet, wherein the first central portion and the second central portion form a bending portion of the protector through the second thermocompression bonding.

10. The method according to claim 9, wherein the step of folding the first edge portion includes a sub-step of causing the first edge portion of the first sheet to tightly contact the first edge of the first substrate.

11. The method according to claim 9, wherein the second sheet further has a third edge portion that is aligned with the first edge of the first substrate.

12. The method according to claim 9, wherein each of the first thermocompression bonding and the second thermocompression bonding is performed at a temperature of 100° C. to 190° C.

* * * * *